Oct. 10, 1933.  B. C. FLYNN  1,929,414

COMBINED VALVE AND PISTON

Filed April 4, 1932

INVENTOR
Bernard C. Flynn
BY Arthur C. Brown
ATTORNEY

Patented Oct. 10, 1933

1,929,414

UNITED STATES PATENT OFFICE

1,929,414

COMBINED VALVE AND PISTON

Bernard C. Flynn, Tulsa, Okla., assignor of one-half to Frederick A. Frank, Tulsa, Okla.

Application April 4, 1932. Serial No. 603,095

7 Claims. (Cl. 103—225)

My invention relates to fluid-control apparatus and more particularly to a combined valve and piston, the principal object of the invention being to utilize the pressure of fluid exerted against a piston traveling in a cylinder in one direction for expanding the piston radially against the cylinder wall with a force proportionate to the pressure of the fluid in the cylinder, and to employ the pressure of fluid exerted against the piston when traveling in the opposite direction to contract the piston for readily bypassing the fluid.

Further objects of my invention are to eliminate the necessity of piston rings for sealing a piston in its sliding relation with a cylinder and to form a piston in a manner to insure ready and continuous conformation of the piston to its cooperating cylinder wall.

In accomplishing these and other objects of my invention, I have provided improved details of structure, the preferred forms of which are illustrated in the accompanying drawing, wherein.

Figure 1:
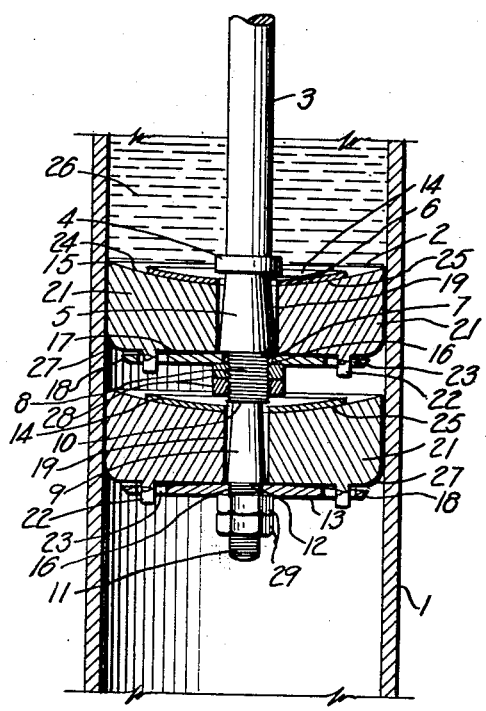
Fig. 1 is a central longitudinal section of a cylinder shown fragmentarily and of a plurality of combined valves and pistons, embodying my invention, mounted therein.
Figure 2:
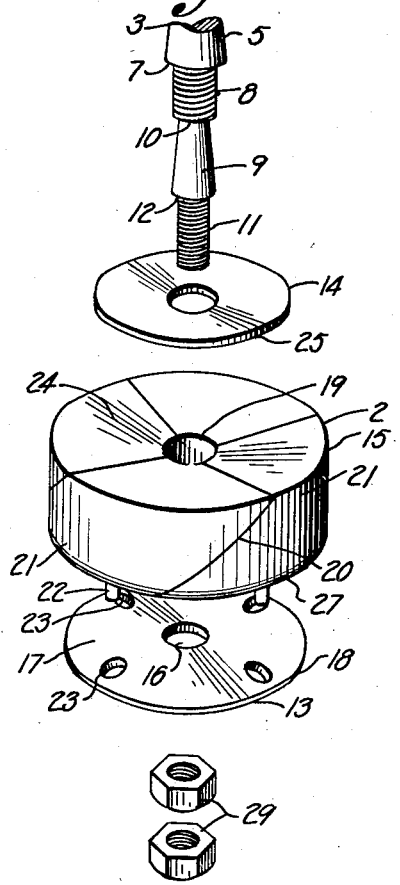
Fig. 2 is a detail perspective view of one of the valve and piston members in disassembled relation with a stem or piston rod.
Figure 3:
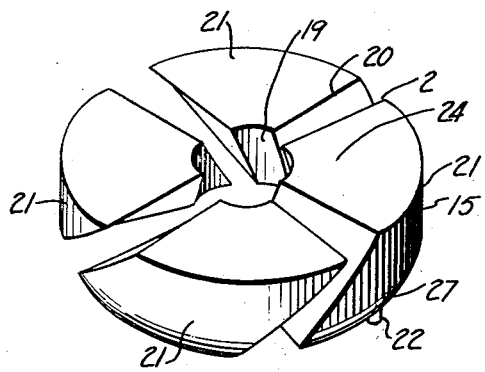
Fig. 3 is a perspective view of the piston segments in slightly spaced condition.

Referring more in detail to the drawing:

1 designates a portion of a cylinder which may comprise a pump cylinder or any other tubular member wherein a combination valve and piston assembly 2, embodying my invention, is adapted to reciprocate.

The assembly 2 is mounted on a stem or piston rod 3, the disclosure in Fig. 1 showing two assemblies mounted in tandem on one rod, although it will be obvious that only one, or a plurality of more than two assemblies can be employed if desired.

To illustrate one method of securing the assemblies 2 in tandem on a rod, I have shown the stem provided with a flange 4 and a relatively large upwardly converging conical portion 5 adjacent the flange to form a stop shoulder 6. Below the portion 5 the stem is reduced to form a second stop shoulder 7 and is externally threaded, as indicated at 8, for a purpose presently described.

The shaft continues in a relatively small conical portion 9, similar in formation to the portion 5, thereby forming a third stop shoulder 10, and terminates in a further reduced threaded end 11 whereby a fourth and final shoulder 12 is formed.

Each of the assemblies 2 comprises a supporting plate 13, an upper disk 14, and a segmental piston or valve 15, preferably formed of soft or alloy metal and mounted between the plate and disk, and since both of the assemblies shown are substantially identical in structure, only one will be described in detail.

The supporting plate 13 is provided with a concentric opening 16 for receiving the rod 3 and its upper surface is slightly convexed as indicated at 17 while its outer edge 18 tapers upwardly, all for purposes presently described.

The segmental piston is provided with a central opening 19 to admit the stem and is severed on oblique radial lines, as shown at 20, to form cooperating segments 21. Projecting downwardly from each segment and preferably formed integrally therewith is a lug or pin 22 adapted to be aligned with and extended through an aperture 23 of the supporting plate; these apertures being preferably elongated to permit limited radial movement of the segments independently of the plate.

On its upper end the segmental piston is provided with a concave surface 24 conforming substantially to a lower convex surface 25 of the upper disk 14. Attention is directed to the considerably smaller diameter of the disk than the piston to expose a relatively large portion of the concave piston surface adjacent its periphery to the action of fluid 26 in the cylinder for rocking the segments on the supporting plate to force them into intimate contact with the cylinder wall.

The lower peripheral edge of the piston is rounded, as shown at 27, so that fluid pressure exerted against the lower end of the piston will rock the segments upwardly on the supporting plate, thus contracting the piston to permit fluid to bypass around the piston. It will be noted that this action of the fluid is promoted by the tapered edge 18 of the plate.

Lock nuts 28 threaded on the portion 8 of the stem securely maintain the upper supporting plate in engagement with the stop shoulder 7 while nuts 29 threaded on the reduced end 11 of the stem hold the lower supporting plate against the shoulder 12.

Assuming a combined valve and piston to be constructed as described, the manner of assembling the device and the operation thereof would be as follows:

The disk and supporting plate having the larger concentric openings are sleeved on the stem into abutment with the respective stop shoulders 6 and 7, and the lock nuts 28 are threaded against the supporting plate. The segments of the piston having the largest axial opening may then be readily mounted about the stem between the disk and plate. In like manner the disk, supporting plate and piston having the smaller concentric openings are mounted consecutively on the lower end of the stem and held thereon by the nuts 29.

When elevating fluid or liquid in the cylinder, the outer portions of the concave piston surfaces are exposed to the fluid and the segments are forced by the liquid into intimate engagement with the cylinder wall, this action being facilitated by the tapered faces 17 of the supporting plates.

Upon downstroke of the piston into a body of liquid, the segments are rocked upwardly and inwardly by liquid striking the rounded edges 27, the tapered edges 18 of the supporting plates tending to direct the flow of liquid toward these rounded edges.

The number of segments comprising a piston depends on the diameters of the piston and cylinder, it being obvious that more segments are desirable in pistons operating in comparatively large cylinders.

Thus it will be possible for the segments to readily wear into conformity with the contour of the cylinder wall and particularly if formed of soft alloy metal, the particles wearing from the segments will tend to fill the pores and smooth out the irregularities in the wall of the cylinder.

For some purposes it may be desirable to alternately invert the pistons and form the conical portions of the stem accordingly, and it may likewise be advantageous in some instances to employ cylinders having a non-circular cross section, the sealing action of the pistons remaining substantially the same.

Figure 4:
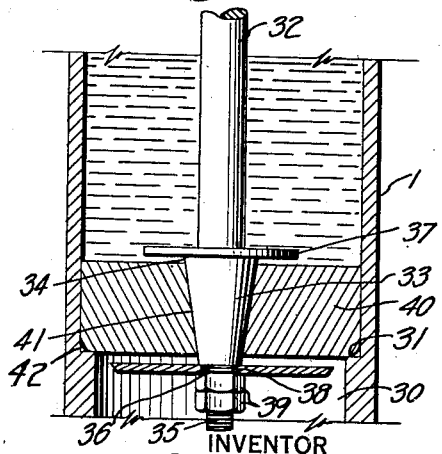
Fig. 4 is a longitudinal central section of my device serving more particularly as a valve and forced outwardly against a cylinder wall by mechanical means.

In the modified form illustrated in Fig. 4, the cylinder 1 may comprise a portion of a valve body and is preferably provided with an inset portion 30 forming an upwardly facing seat 31.

A valve stem 32, moved longitudinally in the cylinder by any suitable mechanism, is provided with an enlarged conical portion 33 forming an upper stop shoulder 34 and terminates in a reduced threaded lower end 35 forming a lower shoulder 36. An upper disk 37 of relatively small diameter may be formed integrally with the stem adjacent the shoulder 34 or secured thereto by welding or the like, and a lower supporting plate having a concentric opening 38 for receiving the shaft portion 35 is securely held against the lower shoulder by lock nuts 39.

A segmental piston 40, severed in a manner identical to the pistons described in my preferred form, but having an inversely directed conical opening 41, is mounted about the stem between the disk and plate. As indicated at 42 in Fig. 4, the piston may be slightly rounded to facilitate bypassing of fluid around the piston when lifted from its seat.

It will be apparent that downward movement of the valve stem moves the piston or valve against its seat and the conical portion of the stem forces the piston segments outwardly against the wall of the cylinder. Upon elevation of the stem the supporting plate lifts the piston from its seat and the segments will be free to move inwardly from the cylinder wall for bypassing fluid.

What I claim and desire to secure by Letters Patent is:

1. In combination with a cylinder, a reciprocating piston rod in the cylinder, spaced supports on the rod, a circular series of segments carried between the supports provided with overlapping spirally shaped ends and arranged for movement on one of the supports whereby the end of one segment slides on the end of the adjacent segment to spirally contract under influence of fluid in the cylinder to pass fluid between the segments and the cylinder when the piston moves in one direction, and to spirally expand into sealing engagement with the cylinder to trap fluid when the piston moves in the opposite direction.

2. In combination with a cylinder, a reciprocating piston rod in the cylinder, a support fixed on the rod having a downwardly and outwardly sloping upper face, a circular series of segments carried on the support provided with overlapping spirally shaped ends and having their lower ends supported on said sloping face of the support whereby the segments move in oblique spiral contraction under influence of fluid in the cylinder to pass fluid between the segments and the cylinder when the piston rod moves in one direction, and to move in oblique spiral expansion into sealing engagement with the cylinder to trap the fluid when the piston moves in the opposite direction.

3. In combination with a cylinder, a reciprocating piston rod in the cylinder, spaced supports on the rod, a circular series of segments carried between the supports provided with overlapping spirally shaped ends and arranged for movement on one of the supports whereby the segments move inwardly under influence of fluid in the cylinder to pass fluid between the segments and the cylinder when the piston moves in one direction, and to move in spiral expansion into sealing engagement with the cylinder to trap fluid when the piston moves in the opposite direction, the segments having their lower outer edges relieved to direct the fluid past the segments when the segments move inwardly.

4. In combination with a cylinder, a reciprocating piston rod in the cylinder, a support on the rod having a downwardly inclined upper face and having openings therein, a circular series of segments carried on said support provided with spirally shaped overlapping ends and arranged for movement on the inclined face of the support whereby the segments move under influence of fluid in the cylinder to pass fluid between the segments and the cylinder when the piston moves in one direction, and to move outwardly into sealing engagement with the cylinder to trap said fluid when the piston rod moves in the opposite direction, and lugs formed on the segments and loosely engaging said openings for limiting movement of the segments on the support.

5. In combination with a cylinder, a reciprocating piston rod in the cylinder, spaced supports on the rod, a piston carried between the supports including a circular series of segmental members having contacting faces inclined in the same direction around the axis of said rod and arranged for contractive and expansive movement on one of the supports whereby the segmental members move inwardly under influence of fluid in the cylinder to pass fluid around the piston when the piston rod moves in one direction, and outwardly 6. In combination with a cylinder, a reciprocating piston rod in the cylinder, spaced supports on the rod, a piston carried between the supports including a circular series of segmental members having contacting faces inclined in the same direction around the axis of said rod and arranged for spiral contractive and expansive movement on one of the supports whereby the ends of the segmental members opposite to said support move inwardly under influence of fluid in the cylinder to pass fluid between the segmental members and the cylinder when the piston moves in one direction, and outwardly into sealing engagement with the cylinder to trap said fluid when the piston moves in the opposite direction.

7. In combination with a cylinder, a reciprocating piston rod in the cylinder, a support on the rod having a downwardly inclined upper face and having openings therein, a circular series of segments carried on said support and arranged for movement on the inclined face of the support whereby the segments move under influence of fluid in the cylinder to pass fluid between the segments and the cylinder when the piston moves in one direction and to expand outwardly into sealing engagement with the cylinder to trap said fluid when the piston rod moves in the opposite direction, lugs formed on the segments engaging in said openings for limiting movement of the segments, a disk member loosely mounted on the rod and having a convex lower face engaging the segments, and means on the rod spaced from the piston and engageable with the disk to limit vertical movement of the segments on the rod.

BERNARD C. FLYNN.